INVENTOR
ROBERT H. RAKESTRAW
BY B. P. Fishburn, Jr.
ATTORNEY

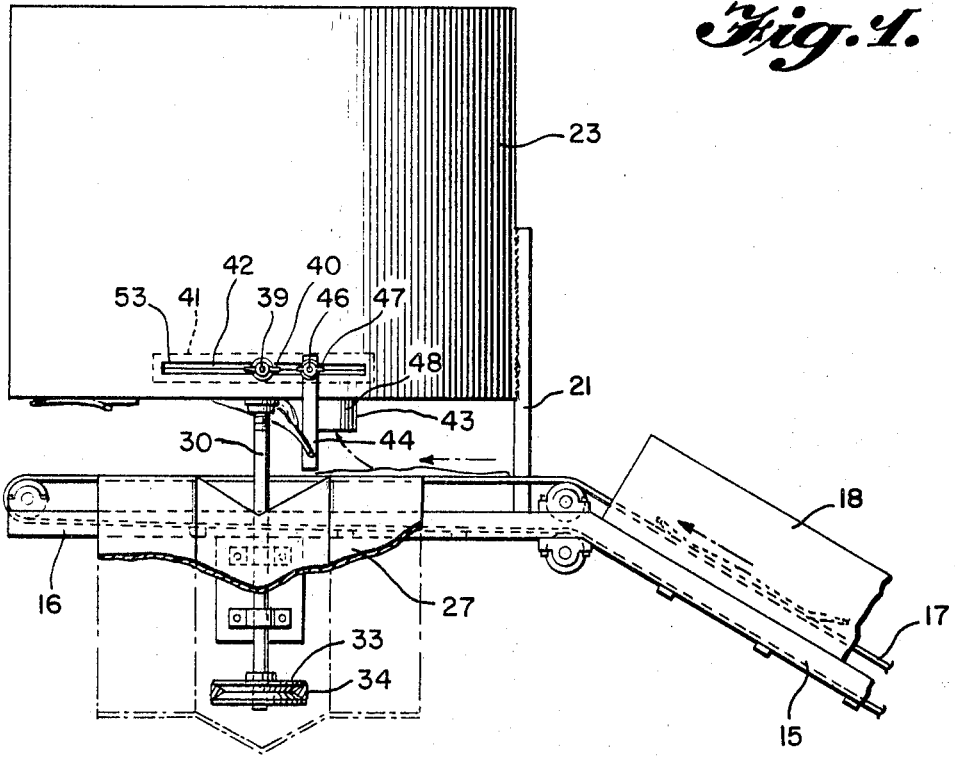
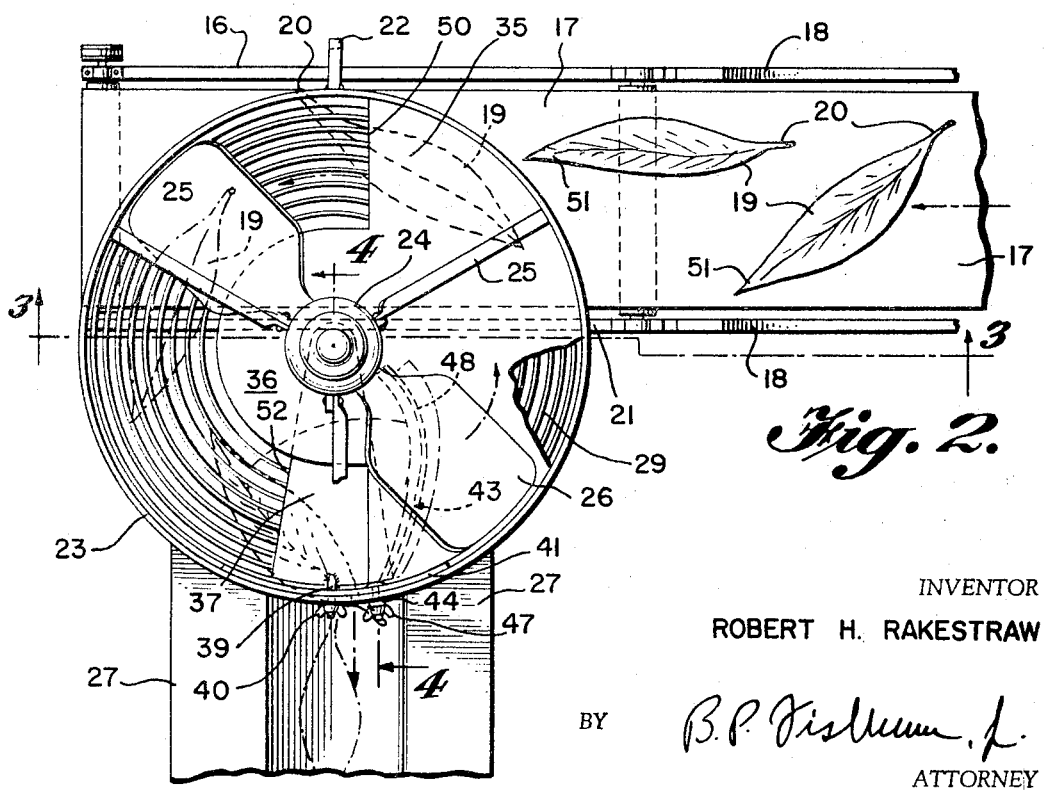

INVENTOR
ROBERT H. RAKESTRAW
ATTORNEY

United States Patent Office 3,439,793
Patented Apr. 22, 1969

3,439,793
CONVEYING AND ORIENTATION APPARATUS
PARTICULARLY FOR TOBACCO LEAVES
Robert H. Rakestraw, Box 13, Stoneville, N.C. 27048
Filed July 19, 1967, Ser. No. 654,471
Int. Cl. B65g 47/24, 47/52
U.S. Cl. 198—33          10 Claims

ABSTRACT OF THE DISCLOSURE

An apparatus which receives randomly arranged tobacco leaves on a conveyor and automatically aligns or orients the leaves and delivers them to a chute with their stems facing in one direction, the chute carrying the oriented leaves to a collection point or receptacle. The apparatus may form an attachment to a tobacco leaf harvester.

Background of the invention

A rather critical problem connected with the harvesting and the subsequent curing of tobacco leaves resides in the necessity for orienting the leaves or aligning them with their stems facing in one direction. The reasons behind this requirement are known to those skilled in the art. Machines have been developed with some degree of success for removing the tobacco leaves from the plants but these machines have not succeeded in delivering the separated leaves to a conveyor or to a receptacle in the desired oriented condition. Consequently, leaf orientation has generally been accomplished by manual labor in a slow and uneconomical manner.

The prior art has offered certain solutions to the problem and one example of this is in prior United States Patent 2,618,373 to Hathaway, issued Nov. 18, 1952. In this prior patent, tobacco leaves in random order are conveyed into a vertical air current and deposited therein where the leaves, by gravity, tend to orient themselves with their heavier stem ends downwardly, the leaves passing downwardly through the air current and being deposited on another conveyor in an oriented condition. It has been found that this arrangement wherein the delicate tobacco leaves are allowed to tumble loosely in the rather violent air current are bruised and torn and thus have their value diminished.

According to the present invention, the orientation of the leaves and their movement to a collection station is accomplished in an efficient manner without any damage to the valuable leaves and by a much more simplified and economical mechanism than any proposed by the prior art.

Summary of the invention

The invention apparatus embodies an inlet conveyor for the tobacco leaves and a discharge chute for carrying the oriented leaves to a collection station or receptacle. Above portions of the inlet conveyor and discharge chute is arranged a suction head through which an upward air current is developed for lifting the leaves gently from the conveyor. A rotary screen at the bottom of the suction head turns somewhat faster than the movement of the inlet conveyor and has its speed regulated through a variable pulley drive. The upward air current holds the leaves in gentle contact with the bottom of the rotary screen while the latter turns and carries the leaves toward the discharge chute. Adjacent the chute, the leaves are released from the rotary screen by the action of an adjustable air current blocking plate and the leaves enter the chute properly oriented and are gently carried to a point of collection.

Brief description of the drawings

FIGURE 1 is a fragmentary side elevation of an apparatus for conveying and orienting tobacco leaves in accordance with the invention, parts broken away and parts in section;

FIGURE 2 is a fragmentary plan view of the invention;

Description of the preferred embodiment

Figure 3:
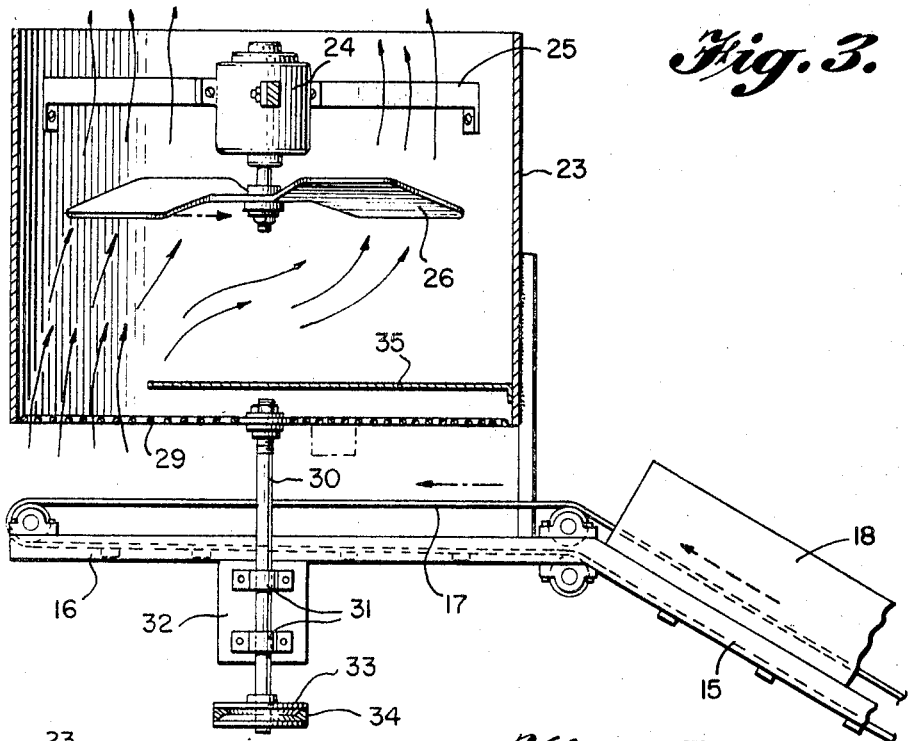
FIGURE 3 is a vertical section taken on line 3—3 of FIGURE 2.

In the drawings, wherein like numerals designate like parts, the numeral 15 designates an inclined section of a conveyor which may constitute a part of a tobacco harvester or, in some instances, a part of a separate machine for orienting tobacco leaves. The top of the conveyor is formed by a relatively short horizontal section 16 leading from the inclined section 16, as shown, and the entire conveyor structure is supported in any suitable manner and may be powered conventionally from the harvester by means not shown herein. The leaf conveying element is an endless flexible rubber-like belt 17 moving in the direction of the arrows and whose upper run carries the tobacco leaves into the orienting apparatus in random arrangement. The conveyor belt 17 is bounded by side walls 18 which restrict the randomly arranged tobacco leaves 19 somewhat. That is to say, the leaves 19, FIGURE 2, may extend longitudinally of the belt 17 with their stems or butts 20 arranged either forwardly or rearwardly or the leaves may be positioned diagonally of the belt, as shown in FIGURE 2, with the stems facing forwardly or rearwardly. However, the leaves are prevented by the side walls 18 from extending across the belt transversely or at right angles to the line of movement of the belt and generally the individual leaves will not attain an angle of more than about forty-five degrees to the line of movement of the belt, as shown.

Suitably bracketed to the top section 16 of the conveyor as at 21 and 22 is a relatively large diameter suction head or shell 23 which overlies the top horizontal section 16 of the conveyor and is spaced above the same. Within the upper portion of the tubular shell 23 is a motor 24 supported on the shell by radial arms 25 and driving a fan 26 whose blades operate within the shell to produce an updraft of air therethrough, as shown by the arrows in FIGURE 3. As shown in FIGURE 2, the shell 23 is offset to one side of the conveyor structure so that approximately one-half of the circular suction head overlies the conveyor and approximately one-half of the suction head extends beyond one side of the conveyor, the rotational axis of the motor 24 being positioned approximately at one side edge of the conveyor.

Directly below the offset or projecting part of the shell 23 is an inclined trough-like discharge chute 27 for oriented tobacco leaves delivered thereto by the apparatus in a manner to be described. The upper end of the chute 27 is fixedly secured as at 28 to one side of the conveyor section 16, FIGURE 4. As will be described, the tobacco leaves 19 will all enter the chute 27 with their stems 20 facing downwardly and the chute will deliver the leaves properly oriented to a collection point or receptacle, not shown.

At the bottom of the tubular shell 23 and spaced above the top horizontal portion of belt 17 is a circular grille or screen 29 of substantial rigidity secured to and carried by a central vertical drive shaft 30 journaled for rotation in bearings 31 suitably secured to the conveyor structure as at 32. The shaft 30 is power-driven by any convenient means through a variable speed belt transmission, not shown, of conventional construction including a pulley 33 and transmission belt 34. In this manner, the grille 29 may be driven in the direction of the arrows at the proper speed and preferably at a speed greater than the linear speed of the belt 17.

Figure 5:
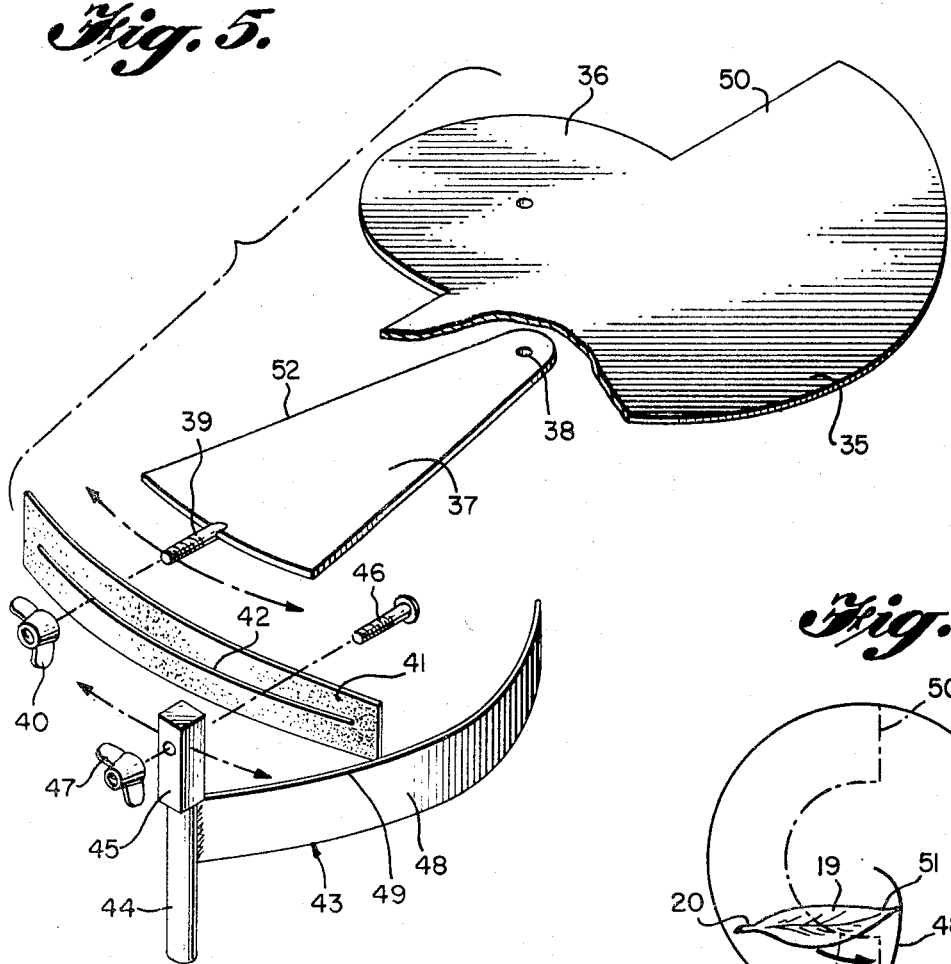
FIGURE 5 is an exploded perspective view of air current control elements and leaf aligner elements.

Immediately above the grille or screen 29 is an air blockage plate 35 fixed to the side wall of the shell 23 and being stationary relative to the belt 17 and rotary grille 29. As shown, the plate 35 is roughly semicircular and covers approximately one-half of the area of the shell 23 and screen 29, leaving the other portion of the rotary screen uncovered. The air blockage plate includes a central reduced width portion 36 which is circularly curved and covers only the centermost part of the rotary screen. The air blockage plate 35 further comprises an angularly adjustable gate valve plate or part 37 pivoted at 38 to the center portion 36 of plate 35 and tapering toward the center of the suction head, FIGURES 2 and 5. The gate valve 37 carries an outer threaded extension 39 rigid therewith operating through a horizontal slot in the shell 23 and receiving a locking wing nut 40 on the outside of the suction head to fix the adjustment of the plate 37; to reduce the escape of air through the adjustment slot in the shell 23, a rubber-like gasket strip 41 is mounted on the inner face of the shell 23 and has a narrow slit 42 through which the element 39 may extend snugly and be adjusted circumferentially of the shell 23. The slit 42 tends to remain closed and relatively airtight to increase the efficiency of the leaf-lifting air current produced by the fan 26. As will be further described, the effectiveness of the air blockage plate causing release of the tobacco leaves at a rather precise point relative to the chute 27 is increased and rendered adjustable by means of the valve plate 37 which is disposed above the chute, see FIGURE 2.

The apparatus further includes a leaf aligner unit 43 near and above the chute 27, assuring the proper release of certain leaves from the screen 29, as will be described. The unit 43 comprises a vertical abutment bar 44 which extends for some distance below the revolving screen 29, FIGURE 4, near the discharge station of the apparatus. The bar 44 is mounted close to the periphery of the shell 23 and revolving screen. The bar 44 includes a head portion 45 rigidly secured by a bolt 46 and nut 47 to the side wall of housing or shell 23. The unit 43 further comprises a curved leaf alignment blade 48 fixedly secured to the bar 44 and extending generally radially inwardly from the bar 44 underneath the rotary grille 29 with its top edge 49 very close to the grille but not contacting the same and not interfering with the movement of the grille. As will be described, the blade 48 engages certain tobacco leaves near their point of release into the chute 27 and turns them so that their butts or stems 20 will be directed downwardly in the chute. In other cases, the stems 20 will engage the abutment bar 44, FIGURE 4, to cause turning and proper orientation of the leaves and stems at the moment of their delivery into the chute 27.

*Summary of operation*

The harvested tobacco leaves 19 are deposited at random on the belt 17 and travel to the suction head 23 either diagonally arranged on the belt or generally longitudinally arranged, as previously explained. In either case, the stems 20 may face forwardly or rearwardly. The fan 26 is in operation and an upward current of air is flowing continuously through the grille 29 and tubular shell 23 tending to lift the tobacco leaves by suction from the belt 17. The grille 29 is being driven in the direction of the arrows at a rotational speed somewhat greater than the linear speed of the belt 17, FIGURE 2.

Figure 4:
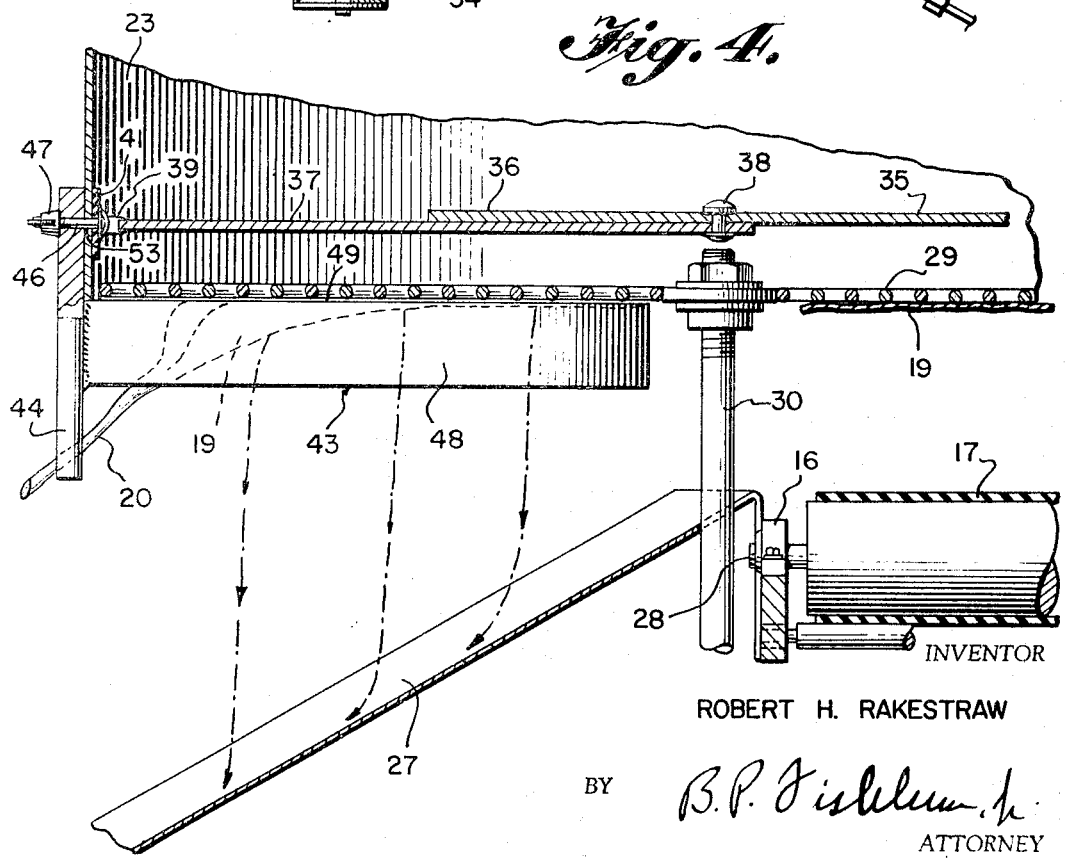
FIGURE 4 is an enlarged fragmentary vertical section taken on line 4—4 of FIGURE 2.

The plate 35 blocks or interrupts the upward current of air over its entire area including the adjustable valve plate portion 37. Therefore, the oncoming leaves 19 on the belt 17 are not influenced by the air current until they begin to emerge from under the edge 50 of plate 35. If the stem 20 is trailing, the lighter tail portion 51 of each leaf will immediately be drawn into contact with the rotating grille 29 by the air current and the grille will begin to carry the leaf in a circular path, FIGURE 2, toward the chute 27. The body of the leaf will be firmly, if gently, held against the bars of the rotating grille in a smooth and flat manner without bruising or tearing. The heavier stem or butt 20 will also be influenced by the air current but due to its increased weight and slender shape may tend to hang down from the grille 29 while moving with the grille generally as shown in FIGURE 4. If the stem 20 is arranged forwardmost as the leaf emerges from under the edge 50 of plate 35, it will not be influenced immediately by the air current in the suction head and the leaf will travel a bit further with the belt 17 before being picked up by the grille 29 when the wider body portion of the leaf emerges from the edge 50. These variations caused by the initial random placement of the leaves on the conveyor belt 17 cause different leaves to assume different positions on the rotating grille 29, as will now be obvious. The tobacco leaves will also vary somewhat in size, the leaves near the top and bottom of the tobacco stalk being considerably smaller than the leaves at the middle portion of the stalk or plant. The adjustment of the valve plate 37 compensates for these differences, and it is desirable that the larger tobacco leaves should be dropped or released into the chute 27 a bit earlier due to their added length. This is accomplished by adjusting the valve plate 37 so that the air cut-off edge 52 will move to the left or clockise in FIGURE 2 and cut off the air current sooner effecting the leaf 19 traveling with the grille 29. This prevents the larger leaves from moving too far toward the rear of the chute and assures that all leaves will be deposited near the middle of the chute.

Additionally, each leaf moving with the grille 29 has forward momentum proportional to the speed of the grille. When released or dropped, the leaf tends to continue to move somewhat further in the direction of movement of the grille, and it appears that the larger leaves tend to travel further after release than smaller leaves. Again, the adjustment of valve plate 37 adequately takes care of these problems so that all leaves can be dropped into the chute 27 generally at the middle of the chute.

The leaf aligner unit 43 is also adjustable circumferentially of the shell 23 in the same horizontal slot which receives the threaded element 39 of valve plate 37. That is to say, the bolt 46 of the leaf aligner unit engages through the same adjustment slot 53 of shell 23, FIGURE 1, which receives the element 39. Consequently, the aligner unit 43 can be adjusted to correspond with a particular setting of the valve plate 37 to further control or locate the precise point at which each leaf will be released or dropped into the chute 27. The aligner unit 43 can be adjusted toward or away from the point at which the leaf is released, depending upon average leaf size at the time of harvest.

When a particular leaf 19 of larger size has its stem 20 projecting forwardly while on the rotating grille 29 and also projecting somewhat beyond the periphery of the grille, such stem will eventually engage the abutment bar 44, FIGURE 4 and FIGURE 2, and this will cause the leaf to turn substantially simultaneously with its release from the grille 29 and to drop into the chute 27 with its stem facing forwardly or downwardly. Such action is depicted at the bottom of FIGURE 2.

Figure 6:
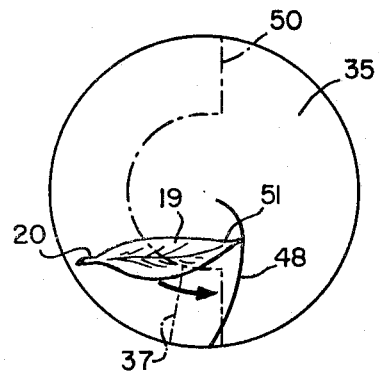
FIGURES 6, 7 and 8 are diagrammatic views depicting the operation of the apparatus for aligning or orienting leaves.
Figure 7:
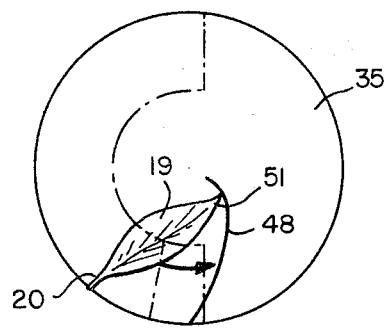
Figure 8:
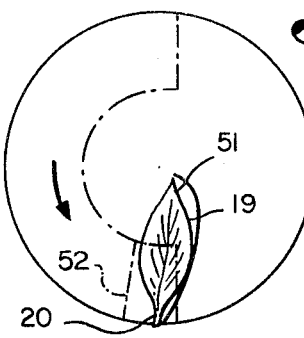

When a leaf has its stem trailing on the moving grille 29 and its stem 20 is not projecting beyond the periphery of the grille, the adjustment valve plate 37 will begin the release of the light end of the leaf as the same passes under the edge 52 and momentum will carry the leaf into contact with the curved alignment blade 48 whose action is shown diagrammatically in FIGURES 6, 7 and 8. In these three figures, it may readily be seen that the leading end of the leaf, FIGURE 6, comes into contact with the blade 48 and as greater areas of the leaf continue to be released from the holding action of the air current, the leaf is gradually turned, FIGURES 7 and 8, until the stem 20 extends radially and is aligned above the chute 27. FIGURE 8 shows this condition and the entire leaf is now beyond the control edge 52 of valve plate 37 and the leaf is free to drop into the chute 27.

It may now be seen that the unique coaction of the conveyor belt 17, revolving grille 29, air blockage plate 35 and adjustable alignment unit 43 assures that all of the leaves will be deposited in the chute 27 with their stems facing in the same direction for delivery to a receptacle or the like. The mode of operation is very simple and the apparatus is simple, compact and relatively inexpensive. Most importantly, the leaves are not bruised, torn or even subjected to any rough handling. They are gently picked up from the belt 17 by suction and carried by the grille 29 to the adjustable release station where the suction is broken and the leaf is gently turned, either by the action of the bar 44 or the blade 48 to the properly oriented condition. The advantages of the invention and its economies should now be apparent to those skilled in the art, without the necessity for any further description.

It is to be understood that the form of the invention herewith shown and described is to be taken as a preferred example of the same, and that various changes in the shape, size and arrangement of parts may be resorted to, without departing from the spirit of the invention or scope of the subjoined claims.

What is claimed is:

1. An apparatus for conveying and orienting tobacco leaves or like articles comprising an inlet conveyor means for tobacco leaves with the leaves randomly arranged, an outlet conveyor means for oriented leaves having their stems facing in one direction, and an intermediate transfer and orientation unit between the inlet and outlet conveyor means, said unit disposed above portions of the inlet and outlet conveyor means and said unit comprising a rotary foraminous transfer member for said leaves and means to create an updraft through said transfer member so that leaves will be picked up from the inlet conveyor means and held against the transfer member by said updraft and carried by the transfer member from the inlet conveyor means to a point near the outlet conveyor means, an air blockage member covering a part only of the foraminous transfer member and defining limits for the updraft therethrough, said leaf alignment means on said unit in the path of movement of the leaves with the transfer member and engageable with certain leaves at points near the outlet conveyor means to cause uniform entry of the leaves onto the outlet conveyor means.

2. An apparatus for conveying and orienting tobacco leaves in accordance with claim 1, and wherein said inlet and outlet conveyor means are arranged substantially at right angles and said unit is an upright substantially circular unit spaced above and having substantially equal area parts overlying each conveyor means.

3. An apparatus for conveying and orienting tobacco leaving in accordance with claim 2, wherein the inlet conveyor means includes an endless conveyor belt element for said leaves including a horizontal top portion passing under said unit, and said outlet conveyor means consisting of an inclined chute beneath said unit adapted to receive oriented leaves dropped from said unit.

4. An apparatus for conveying and orienting tobacco leaves in accordance with claim 2, and wherein said unit includes a tubular shell, means on the shell to create said updraft therethrough, a drive shaft secured to the rotary transfer member to turn the same, and variable transmission means connected with the drive shaft and enabling the latter to turn the transfer member at a speed in excess of the linear speed of the inlet conveyor means.

5. An apparatus for conveying and orienting tobacco leaves in accordance with claim 1, wherein said rotary transfer member is a substantially flat rotary screen and said air blockage member is a plate member near and above said screen having updraft control edges, and a plate valve element adjustably connected with the air blockage member and being movable circumferentailly of the rotary screen to change the effective position of one of said control edges.

6. An apparatus for conveying and orienting tobacco leaves in accordance with claim 1, and wherein said leaf alignment means comprises a first abutment member mounted near the periphery of the rotary transfer member and extending therebelow to block the passage of hanging tobacco leaf stems and thereby turn the tobacco leaves when they are adjacent the outlet conveyor means, and a second abutment member extending beneath the transfer member to engage the body portions of leaves as they are released from the transfer member and turning the leaves to properly oriented positions at the outlet conveyor means.

7. An apparatus for conveying and orienting tobacco leaves in accordance with claim 6, and wherein the leaf alignment means is adjustable circumferentially of the transfer member and the second abutment member is a curved plate lying close to the bottom of the transfer member.

8. An apparatus for conveying and orienting tobacco leaves in accordance with claim 1, and wherein said unit includes an upright cylindrical shell and said foraminous transfer member is a circular screen adjacent the lower end of the shell and spaced above the top of the inlet conveyor means, said air blockage member having an angularly adjustable valve plate portion, said shell having an adjustment slot near its lower end, and connection elements for the valve plate portion and said leaf alignment means movably mounted within said slot.

9. An apparatus for conveying and orienting tobacco leaves in accordance with claim 8, and a gasket strip having a narrow slit formed therethrough mounted adjacent said slot to prevent the flow of air through said slot, said slit receiving said connection elements.

10. Apparatus for conveying and orienting tobacco leaves or like articles comprising an inlet conveyor means for randomly arranged tobacco leaves including a substantially horizontal portion, an outlet conveyor means for oriented leaves extending substantially transversely of the inlet conveyor means beyond one side thereof, an upstanding tubular body spaced above said conveyor means and overlying portions of the inlet and outlet conveyor means, means for creating an updraft of air through the tubular body, a rotary grille adjacent the bottom of the tubular body and above the horizontal portion of the inlet conveyor means and having a drive shaft, power means to rotate the drive shaft and grille, an air draft blockage member in the tubular body above the grille and having edges which limit the effective area of said updraft within the tubular body, and an adjustable leaf alignment device on the tubular body shiftable circumferentially thereof and disposed above the outlet conveyor means and including a depending part near the periphery of the grille extending below the grille and another abutment part arranged close to the bottom of the grille and extending generally radially inwardly of the grille.

References Cited

UNITED STATES PATENTS

| | | | |
|---|---|---|---|
| 2,618,373 | 11/1952 | Hathaway | 198—33 |
| 3,367,475 | 2/1968 | Predmore et al. | 198—33 |
| 3,368,568 | 2/1968 | Love et al. | 131—149 |

ANDRES H. NIELSEN, *Primary Examiner.*